US006955162B2

(12) United States Patent
Larson et al.

(10) Patent No.: US 6,955,162 B2
(45) Date of Patent: Oct. 18, 2005

(54) INTERNAL COMBUSTION ENGINE WITH PRESSURE BOOSTED EXHAUST GAS RECIRCULATION

(75) Inventors: Gerald L. Larson, Fort Wayne, IN (US); Anthony J. Cook, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 71 days.

(21) Appl. No.: 10/687,163

(22) Filed: Oct. 16, 2003

(65) Prior Publication Data

US 2005/0081835 A1 Apr. 21, 2005

(51) Int. Cl.[7] ........................ F02M 25/07; F02B 33/44
(52) U.S. Cl. ........................ 123/568.11; 123/568.21; 60/278; 60/605.2
(58) Field of Search ............... 123/568.11, 568.12, 123/568.21; 60/278, 279, 605.2; 477/2, 3, 477/7; 180/65.1, 65.3, 65.4

(56) References Cited

U.S. PATENT DOCUMENTS

| | | | | |
|---|---|---|---|---|
| 5,657,630 A | * | 8/1997 | Kjemtrup et al. | 60/605.2 |
| 5,791,146 A | * | 8/1998 | Dungner | 60/605.2 |
| 6,164,071 A | * | 12/2000 | Shao et al. | 60/605.2 |
| 6,216,461 B1 | * | 4/2001 | Shao et al. | 60/605.2 |
| 6,237,335 B1 | * | 5/2001 | Lonnqvist | 60/605.2 |
| 6,247,311 B1 | | 6/2001 | Itoyama et al. | |
| 6,301,888 B1 | * | 10/2001 | Gray, Jr. | 60/605.2 |
| 6,412,278 B1 | | 7/2002 | Matthews | |
| 6,427,436 B1 | * | 8/2002 | Allansson et al. | 60/278 |
| 6,435,166 B1 | * | 8/2002 | Sato et al. | 123/568.12 |
| 6,470,864 B2 | | 10/2002 | Kim et al. | |
| 6,470,866 B2 | * | 10/2002 | Cook | 60/605.2 |
| 6,588,210 B2 | | 7/2003 | Kreso | |
| 6,641,501 B2 | * | 11/2003 | Kitajima et al. | 477/3 |
| 6,722,458 B2 | * | 4/2004 | Hofbauer | 180/65.4 |

* cited by examiner

Primary Examiner—Willis R. Wolfe, Jr.
(74) Attorney, Agent, or Firm—Jeffrey P. Calfa; Dennis Kelly Sullivan; Susan L. Lukasik

(57) ABSTRACT

An exhaust gas recirculating system for a turbocharged diesel engine utilizes an electrically driven compression pump to boost exhaust gas pressure before return to the engine induction system. Exhaust gas is drawn from the exhaust system or stack some distance removed and downstream from the outlet from the exhaust turbine, compressed to overcome the intake manifold boost pressure, and returned to the intake system along an extended pipe to cool the gas. The compressor is energized from the vehicle battery during periods of demand for peak pressure demand on the engine thereby recycling recaptured energy from the battery to boost engine output. Exhaust turbine performance during periods of peak loading is also improved.

15 Claims, 2 Drawing Sheets

US 6,955,162 B2

INTERNAL COMBUSTION ENGINE WITH PRESSURE BOOSTED EXHAUST GAS RECIRCULATION

BACKGROUND OF THE INVENTION

1. Technical Field

The invention relates to exhaust gas recirculating systems for internal combustion engines and more particularly to an exhaust gas recirculating system for a turbocharged diesel engine.

2. Description of the Problem

Turbocharging is a well known method for increasing the efficiency and boosting the peak power output of an internal combustion engine. An exhaust energy recovery turbine is positioned in the exhaust stream from the engine and uses energy from the exhaust gas to drive a supercharger disposed in the engine's air intake system. The supercharger boosts the density of air delivered to the engine's intake manifold. The increased air density allows additional fuel to be introduced to the cylinders and combusted, increasing engine output. Turbocharging, while used occasionally with spark ignition engines, is more commonly found in compression ignition engines, i.e. diesel engines.

Complicating the application of turbocharging to diesel engines is the need to meet government emission standards, particularly those relating to $NO_x$ emissions. One way in which emissions are reduced is through the use of exhaust gas recirculating systems (EGR) in which exhaust gas is returned to the air intake system. The air intake system for a supercharged diesel engine includes the compressor pump and, usually, an intercooler between the supercharger and the engine's intake manifold. Exhaust gas can be returned ahead of the supercharger, into the intercooler, or directly into the intake manifold. Exhaust gas may be drawn from the exhaust manifold ahead of the energy recovery turbine, or from some point further down the exhaust system. The most common arrangement is to draw exhaust gas directly from the exhaust manifold and to deliver the gas to intake manifold, usually passing the exhaust gas through an intercooler in the EGR line. See, by way of example, U.S. Pat. No. 6,470,864 to Kim et al., U.S. Pat. No. 6,247,311 to Itoyama et al., and U.S. Pat. No. 6,412,278 to Matthews. It is usually considered undesirable to return the exhaust gas to the intake system ahead of the supercharger or the intake intercooler due to the potential of corrosion the exhaust gas poses for these components. The exhaust gas is considerably hotter than ambient air and this reduces the flow mass through the supercharger compressor and reduces the power output of the engine. While Kim et al. and Itoyama et al. provided no pressure boost for the exhaust gas, Matthews stated that the exhaust gas from the exhaust manifold may not have sufficient pressure to allow smooth delivery of the gas into the intake manifold due to pressures in the intake manifold. Matthews provided a hydraulically driven pump in the exhaust gas recirculating line to assure sufficient exhaust gas pressure for delivery to the intake manifold.

Many prior art EGR systems have the disadvantages of introducing an extremely high temperature gas to the engine induction system and of diverting exhaust air flow from the exhaust turbine, reducing the turbine's effectiveness. While all position an intercooler in the EGR line to reduce exhaust gas temperature, these systems still release a great deal of heat into a vehicle's engine compartment, promoting engine overheating. In addition, the need for an intercooler in the EGR line adds substantial expense to the systems.

Cook, U.S. Pat. No. 6,470,866 proposed diverting exhaust gas from the exhaust pipe downstream from the exhaust turbine. This was achieved by restricting flow through the exhaust pipe to boost the pressure of the gas. However, this arrangement increases exhaust system back pressure which again reduces exhaust turbine performance. The prior art proposals considered have all had the disadvantage of reducing peak engine output.

SUMMARY OF THE INVENTION

According to the invention there is provided an internal combustion engine having an air intake system and an exhaust system. Air drawn into the air intake system is boosted by an exhaust gas driven supercharger. An intercooler is usually disposed between the air outlet from the supercharger and an engine intake manifold to increase charge air density. Exhaust gas is drawn from the exhaust system downstream from the exhaust turbine and compressed for return to the air intake system. Pressurized exhaust gas is introduced to the intake system above the intake manifold and after the intake system intercooler. An electric compressor motor drives the recirculated exhaust gas compressor. Power for the compressor motor is supplied from the vehicle electrical system and during periods of highest pressure demand on the engine, almost exclusively from the vehicle's battery plant. When peak engine output is required the compressor avoids reduction in the pressure drop across the exhaust turbine, improving vehicle performance. Battery recharging is directed toward periods when engine load is negative allowing the exhaust gas recirculating system to cooperate with the battery charging system as a vehicle kinetic energy recovery system. Exhaust gas is drawn from the exhaust pipe well outside the engine compartment, after particulate removal (if used) and $NO_x$ reduction, which reduces the temperature of the exhaust gas and the pollution levels thereof without the need for a supplemental EGR line intercooler. This arrangement helps transport waste heat from the engine compartment and reduces the corrosiveness of the recirculated exhaust gas.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
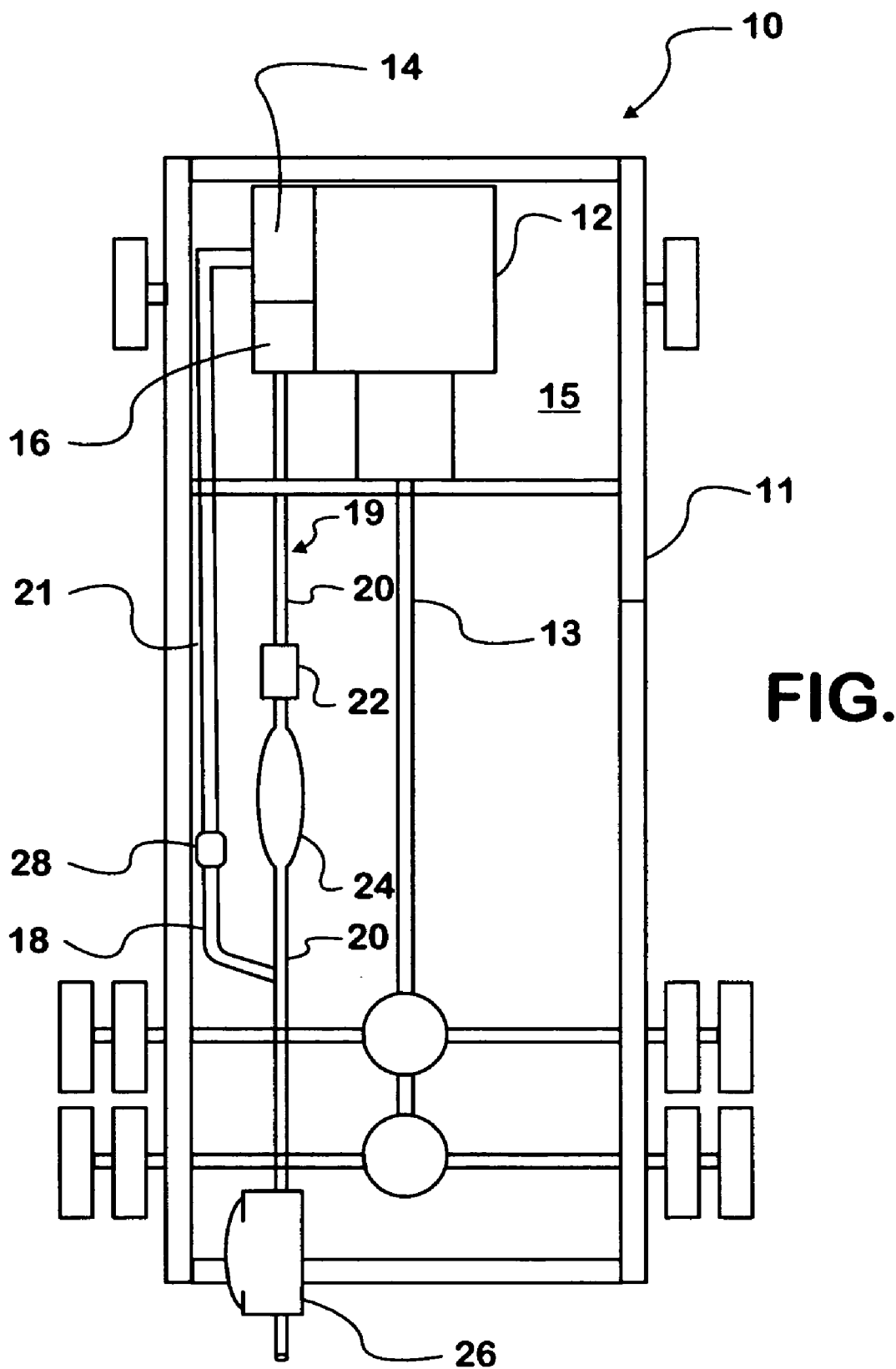
FIG. 1 is a plan view of a vehicle chassis.

Referring now to the figures and in particular to FIG. 1 a vehicle chassis 10 is illustrated. Vehicle chassis 10 includes a frame 11 which supports an internal combustion engine 12 and its drive train 13. Engine 12 has an air intake or induction system 14 into which air is drawn from the ambient environment and compressed for delivery to the engine's cylinders. A high pressure stage exhaust system 16 from engine 12 includes an exhaust manifold and at least a first stage exhaust turbine. The first stage exhaust turbine is mechanically coupled to a compressor/supercharger in the air intake system 14 to compress air for the air intake system. Engine 12 and high pressure stage exhaust system 16 are located toward the front of vehicle chassis 10 in an engine compartment 15. Engine 12 is preferably an ignition compression engine.

Extending toward the back of vehicle chassis 10 from high pressure stage exhaust system 16 is a low pressure exhaust system 19 which is illustrated as including an exhaust pipe 20, a particulate trap 22, an SCR catalytic converter or $NO_x$ adsorber 24 and a muffler 26. Typically an exhaust system will include either the particulate trap 22, or the muffler 26, but not both. An exhaust gas recirculating (EGR) line 21 is connected via sampling line 18 to exhaust pipe 20 at a point downstream from $NO_x$ adsorber 24 and between the adsorber and muffler 26 (if present). Preferably, the point of connection is as far removed from the engine compartment 15 as feasible to allow for cooling of the exhaust gas in the exhaust pipe 20 and EGR recirculating line 21. Exhaust gas is drawn into EGR sampling line 18 by an electrically driven compressor pump 28 located in return line 21. Compressor 28 is likewise located at a point relatively removed from engine compartment 15. EGR return line 21 extends between compressor 28 and air intake system 14 and is made relatively long to allow cooling of the compressed exhaust gas before introduction to the air intake system. Preferably, EGR return line 21 delivers exhaust gas to the engine intake manifold 34. Exhaust gas can be returned to other points in the intake system, such as upstream from supercharger 30 (as shown in phantom in FIG. 2) and still provide energy recycling and improved efficiency as described below, but such an arrangement is not considered desirable.

Figure 2:
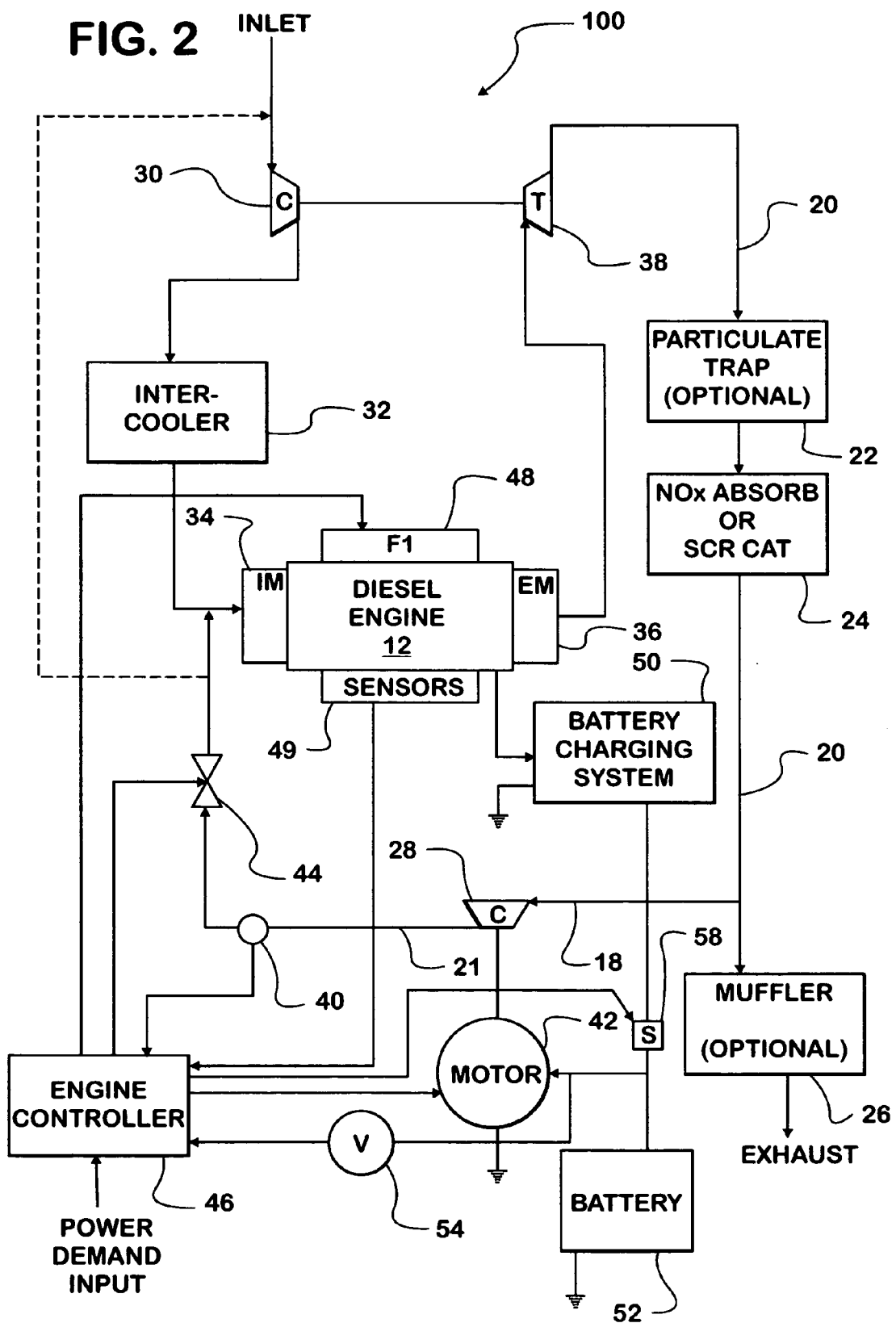
FIG. 2 is a schematic diagram showing a turbocharged engine assembly with boosted exhaust gas recirculating.

Referring now to FIG. 2, a preferred embodiment of an engine assembly 100 incorporating a diesel engine 12, turbocharging and exhaust gas recirculating is shown. Engine assembly 100 draws air from the ambient environment (typically through an air filtration system which is not shown) into a supercharger 30. Compressed air is discharged from supercharger 30 to an intercooler 32 to reduce the temperature of the gas and thereby increase its density for introduction to an intake manifold 34 for diesel engine 12. Fuel from fuel injectors 48 is mixed in the cylinders of engine 12 with air drawn from intake manifold 34. Compression ignition of the mixture occurs in the cylinders and exhaust gas is generated. The exhaust gases pass to an exhaust manifold 36 in the high pressure stage of the exhaust system. The exhaust gases are under considerable pressure and are used to drive an exhaust turbine 38 which is mechanically coupled to drive supercharger 30. Exhaust gas is typically discharged from the exhaust turbine 38 to an exhaust pipe 20, although in some vehicles incorporating turbocompounding, a second stage exhaust turbine (not shown) may be present which is mechanically coupled to an engine drive shaft (not shown). Exhaust gas temperature falls on passage through the exhaust turbine as work is extracted from the gas.

From the exhaust turbine 38 exhaust gas passes down exhaust pipe 20 through a particulate trap 22 (if used) and through an $NO_x$ adsorber or SCR catalytic converter 24. After discharge from SCR catalytic converter 24 into exhaust pipe 20 the exhaust gas passes to a muffler 26 (when no particulate trap is used) and finally out of the exhaust system into the environment. Exhaust gas for recirculating is drawn from exhaust pipe 20 downstream from SCR catalytic converter 24 into an EGR sampling line 18 by a electrically driven compressor pump 28 in EGR return line 21. The exhaust gas is pressurized sufficiently by compressor 28 for delivery to intake manifold 34, overcoming the pressurized intake air in the intake manifold. The discharge of pressurized exhaust gas from EGR return line 21 into intake manifold 34 is usually controlled by an exhaust gas recirculating metering valve 44 positioned between the discharge of compressor 28 and the intake manifold. Metering valve 44 may be replaced by a fixed diameter orifice if the output of compressor 28 is subject to variable control by engine controller 46. Since exhaust gas is drawn from exhaust pipe 20 by a pipe the back pressure in the exhaust pipe is reduced and the operation of exhaust turbine 38 is not negatively affected, and may be improved. By tapping energy from battery 52 to drive motor 42 for compressor 28 the output of engine 12 is increased during periods when peak output is demanded of the engine. In addition, exhaust gas is introduced to intake manifold 34 with no turbocharger induced lag thereby improving transient response.

Engine controller 46 is programmed to provide control over exhaust gas recirculating responsive to engine operating conditions. Exhaust gas pressure is set at a level to obtain a fixed ratio of the recirculated exhaust gas pressure to the pressure of the air in the air intake manifold 34. Pressure sensor 40 in EGR return line 21 and a intake manifold pressure sensor included in engine sensor package 49 provide the required pressure readings. Electrically driven compressor 28 is driven by electric motor 42 which is mechanically coupled to compressor 28. Compressor 28 itself is preferably an electrically operated free piston device or a scroll compressor. These devices exhibit high efficiency without the need for lubrication, which prevents the possibility of passing lubricating oil from the compressor to the intake manifold 34. Engine controller 46 controls energization of electric motor 42 and may control the speed or output of the motor. If used, the position of exhaust gas recirculating metering valve 44 is also determined by control signals provided by engine controller 46. Where valve 44 has been replaced by fixed diameter orifices, the speed of motor 42 is varied by engine controller 46 to obtain the desired exhaust gas pressure. In either case EGR pressure is adjusted in response to intake manifold pressure to obtain a fixed pressure ratio. Engine controller receives inputs from a power demand input source and from a number of engine sensors 49, including cam position sensing, engine oil operating temperature, coolant temperature, propeller shaft speed, intake manifold pressure, exhaust manifold pressure, etc., to effect the desired control. The engine controller 46 also controls fuel injection timing and quantity, and can, accordingly, estimate engine load and determine periods of peak system pressure or output demand. Energization of electric motor 42 exclusively from battery 52 occurs during transient conditions, e.g. vehicle launch, which are characterized by low engine RPMs and high demands for pressure.

A vehicle electrical system conventionally includes a battery charging system 50 and a battery 52. The battery charging system 50 typically includes an alternator which is belt driven from engine 12. Motor 42 is energized from the vehicle electrical system, either from the battery charging system 50 or by discharge from battery 52 should the output of the battery charging system 50 be diverted by the engine controller 46. Diversion may be by means of a switch 58, which shifts the power source to battery 52 during periods of high pressure demand on engine 12. Engine controller 46 monitors the charge state of battery 52 using appropriate instrumentation, such as a voltmeter 54. Engine controller 46 effects energy recapture by emphasizing charging of battery 52 during periods when the engine 12 is under a negative load. In effect the charging system 50 is then used as a brake. Such negative loading occurs when the vehicle is going downhill or stopping. By use of the term "emphasizing" it is meant that a programmable device, such as the engine controller 46 or another on board computer tends to limit battery charging to periods of negative load by only allowing charging during those periods or when the battery exhibits an undesirably low state of charge. The invention provides for tapping this recovered energy during vehicle transient or launch conditions when engine RPMs are low and the call for all pressures is higher. On these occasions energy is drawn from battery 52.

Exhaust gas recirculating with the present invention avoids EGR heat release in the vehicle engine compartment. Improved engine output under high demand conditions is met while maintaining the pressure drop across the exhaust turbine under peak load conditions. In some applications as much as 15 HP can be recovered during peak load conditions on engine 12. Exhaust gases are recovered for recirculating after treatment, making the gases both cleaner and cooler than in prior art EGR systems. Energy recovered and stored as electrical power is recycled to drive the EGR compression pump during periods of high pressure demand on the engine, e.g. during vehicle launch from a standing start. Engine controller 46 is otherwise programmed to implement with conventional exhaust gas recirculating control algorithms minimizing the modifications required to implement the invention.

While the invention is shown in only one of its forms, it is not thus limited but is susceptible to various changes and modifications without departing from the spirit and scope of the invention.

What is claimed is:

1. An internal combustion engine system comprising:
   an internal combustion engine;
   an air intake system to the internal combustion engine;
   an exhaust system from the internal combustion engine;
   an exhaust gas recirculating line having an inlet from the exhaust system and an outlet into the air intake system;
   a compressor system in the exhaust gas recirculating line for drawing exhaust gas from the exhaust system and boosting exhaust gas pressure for delivery to the air intake system;
   an engine controller and engine sensor package for detecting when the internal combustion engine is under negative and positive loads;
   a transducer coupled to receive mechanical energy from the internal combustion engine;
   energy storage means for receiving energy output by the transducer and storing the energy;
   means responsive to detection of a negative load on the internal combustion engine for coupling the energy output of the transducer to the energy storage means for storage as potential energy; and
   means responsive to detection of a positive load on the internal combustion engine for tapping the energy storage means for energy for driving the compressor system in the exhaust gas recirculating line.

2. An internal combustion engine system as set forth in claim 1, further comprising:
   the air intake system including a charge air boost system for raising the pressure of air in the air intake system;
   the exhaust system including an exhaust turbine coupled to drive the charge air boost system, the exhaust turbine further having an inlet for receiving exhaust gas from the engine and an outlet into an exhaust pipe for discharge to the environment; and
   the exhaust gas recirculating line having its inlet from the exhaust system connected to the exhaust pipe downstream from the outlet from the exhaust turbine.

3. An internal combustion engine system as set forth in claim 2, further comprising:
   the exhaust gas recirculating line being sufficiently long to provide substantial exhaust gas cooling prior to introduction of the exhaust gas to the air intake system.

4. An internal combustion engine system as set forth in claim 3, further comprising:
   the air intake system having an intercooler downstream from the charge air boost system and an intake manifold between the intercooler and the engine; and
   the outlet from the exhaust gas recirculating line into the air intake system is downstream from the intercooler and ahead of the air intake manifold.

5. An internal combustion engine system as set forth in claim 4, further comprising:
   the compressor system further including,
   an electrically driven compressor; and
   a metering valve coupling the outlet of the compressor to the air intake system;
   the transducer being an electrical generator; and
   the energy storage means being a battery.

6. An internal combustion engine system as set forth in claim 4, further comprising:
   the compressor system further including,
   a variable output electrically driven compressor; and
   a fixed diameter return orifice between the compressor and the outlet to the air intake system;
   the transducer being an electrical generator; and
   the energy storage means being a battery.

7. An internal combustion engine system as set forth in claim 6, wherein the internal combustion engine is a compression ignition engine.

8. An internal combustion engine assembly comprising:
   an internal combustion engine;
   an intake manifold to the internal combustion engine;
   an exhaust manifold from the internal combustion engine;
   a turbocharger having a combustion air intake, an exhaust gas intake from the exhaust manifold, an exhaust gas outlet and a compressed intake air outlet coupled to the intake manifold;
   an exhaust gas recirculating line fluidically coupled to the exhaust gas outlet of the turbocharger and further coupled to the intake manifold to return exhaust gas to the intake manifold from the exhaust gas outlet;
   a compressor in the exhaust gas recirculating line for pressurizing the exhaust gas;
   a battery;
   a charging system coupled to the internal combustion engine assembly for energization and electrically coupled for returning charge to the battery; and
   the compressor being electrically energized from the battery responsive to transient conditions on the internal combustion engine.

9. An internal combustion engine assembly as set forth in claim 8, further comprising:
   an extended exhaust pipe coupling the exhaust gas outlet from the turbocharger to the exhaust gas recirculating line.

10. An internal combustion engine assembly as set forth in claim 9, further comprising:
the compressor having a controllable output.

11. An internal combustion engine assembly as set forth in claim 9, further comprising:
a metering valve coupling the compressor to the intake manifold.

12. An internal combustion engine assembly as set forth in claim 11, further comprising:
an engine controller for energizing the electrically driven compressor and coupled to the metering valve for the control thereof.

13. A motor vehicle comprising:
an internal combustion engine having an intake manifold and an exhaust manifold;
an exhaust turbine coupled to receive exhaust gas from the exhaust manifold;
a supercharger connected to be driven by the exhaust turbine and coupled to boost charge air into the intake manifold;
an exhaust pipe connected to and extending from the exhaust turbine to carry exhaust gas from the exhaust turbine;
an exhaust gas recirculating conduit including an exhaust gas compressor disposed in the exhaust gas recirculating conduit, the exhaust gas recirculating conduit being connected to the exhaust pipe to allow the exhaust gas compressor to draw exhaust gas from the exhaust pipe and to boost the pressure of the exhaust gas for delivery into the intake manifold;
an electrical supply system powered by the internal combustion engine and including an electrical power storage device;
the compressor being electrically driven; and
means responsive to engine load for alternatingly energizing the compressor from the electrical power storage device and charging the electrical power storage device.

14. A motor vehicle as set forth in claim 13, further comprising:
A $NO_x$ emission reducing system in the exhaust pipe; and
the point of connection between the exhaust gas recirculating conduit and the exhaust pipe being downstream from the $NO_x$ emission reducing system.

15. A motor vehicle as set forth in claim 14, further comprising:
an intercooler coupling the charge air from the supercharger to the intake manifold; and
the exhaust gas recirculating conduit being coupled to deliver boosted exhaust gas to the intake manifold downstream from the intercooler.

* * * * *